Sept. 7, 1937.  T. W. MILLER  2,092,401
VALVE MEANS
Filed Sept. 16, 1935
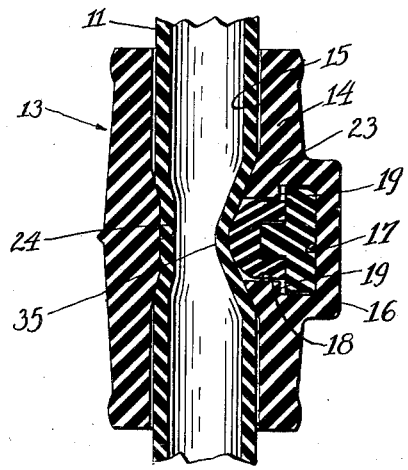
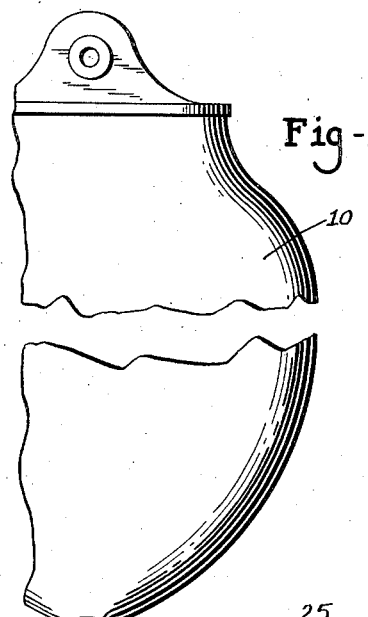
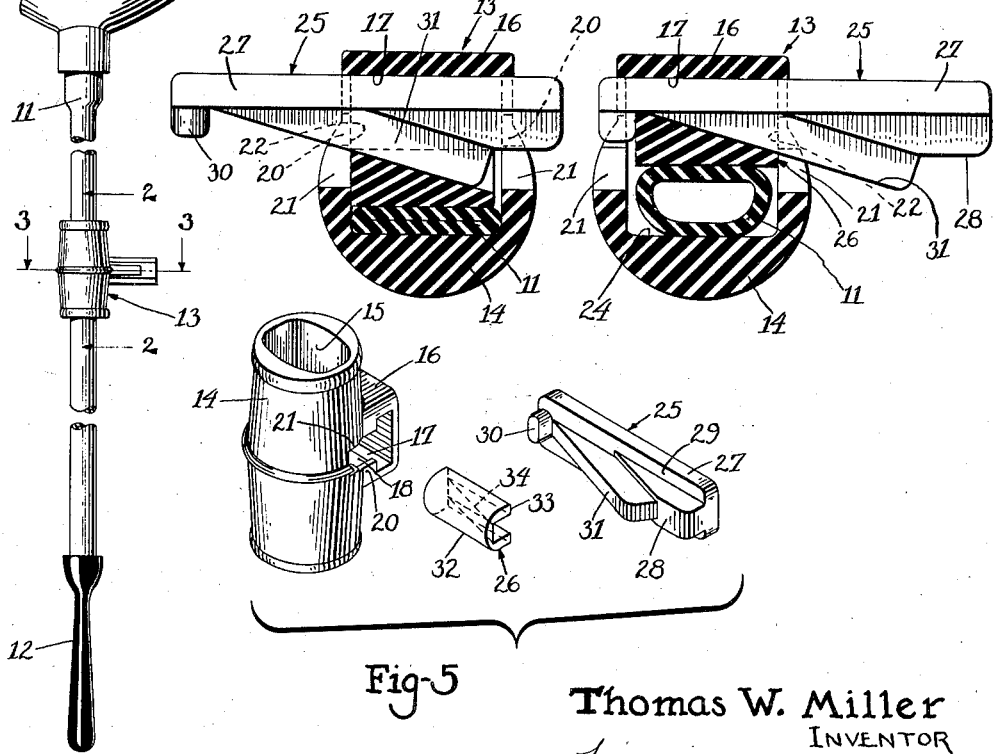
Thomas W. Miller
INVENTOR
By Freeman, Sweet, Albrecht and Weidman
ATTORNEYS Patented Sept. 7, 1937

2,092,401

UNITED STATES PATENT OFFICE 2,092,401

VALVE MEANS

Thomas W. Miller, Ashland, Ohio, assignor to The Faultless Rubber Company, Ashland, Ohio, a corporation of Ohio Application September 16, 1935, Serial No. 40,770

8 Claims. (Cl. 251—5)

This invention relates to valve means, more particularly adapted for use in controlling the flow of fluid in a fountain syringe system, and is further adapted to be used in conjunction with a flexible conduit commonly employed in such fountain syringe system. The object of this invention is to provide new and improved valve means of this character.

In the drawing accompanying this specification and forming a part of this specification, I have shown, for purposes of illustration, one embodiment which my invention may assume, and in the drawing:

Figure 1 is a broken, elevational view of a fountain syringe, disclosing the embodiment of my invention, Figure 2 is an enlarged vertical section taken on the line 2—2 of Figure 1, the valve mechanism being in open position, Figure 3 is an enlarged horizontal section taken on the line 3—3 of Figure 1, and showing the valve mechanism parts in the relation assumed when the valve is in open position, Figure 4 is a horizontal section similar to Figure 3, but showing the valve mechanism parts in the relation assumed when the valve is in closed position, and Figure 5 is a perspective view of the valve means, showing the parts thereof in disassembled relation.

The embodiment herein disclosed comprises a flexible rubber syringe bag 10, to the outlet of which is attached one end of a flexible rubber discharge conduit tube 11. The other end of the conduit 11 may be provided with a discharge tube 12 of any well known construction.

Mounted at a convenient point along the length of the conduit 11, are valve means 13, operable to control flow from the syringe bag 10 to the discharge tube 12.

The valve means 13 comprise a generally tubular body portion 14, having a bore 15 extending longitudinally therethrough, and the bore is preferably formed oval in shape, adjacent the ends thereof, as shown in Figure 5, and being of a size to freely pass the conduit 11.

Intermediate the ends thereof, the body 14 is provided with a transversely extending enlarged portion 16 jutting away from the outer surface of the tubular body 14, the enlarged portion 16 being generally square in configuration and provided with a generally oblong rectangular guide slot 17. The guide slot 17, communicates with the bore 15 of the tubular body 14 through a narrower slot 18, which is substantially equal to the length of the slot 17, and forms shoulders 19 therewith. The ends of the narrower slot 18 are provided with angular projecting portions 20, restricting the entrance to the slot 18, the projecting portions 20 in turn merging with relatively narrow slots 21 formed in the tubular body 14 and extending substantially midway thereof, the projecting portions 20 and relatively narrow slots 21 forming abutments 22, for a purpose hereinafter to be explained.

Adjacent the slot 18, the walls of the bore 15 of the body 14 are substantially straight in transverse extent, and longitudinally these walls are thickened as shown at 23, the point of greatest thickness being adjacent the slot 18, and from this point the walls gradually merge with the walls of the bore 15. Diametrically opposite the slot 18, the walls of the bore have been flattened to provide a generally plane portion 24, of an area substantially equal to the area of the slot 18.

Valve mechanism is provided to cooperate with the tubular body 14, and as here shown, this valve mechanism comprises an actuator 25, mounted for cooperation with an actuated element 26. The actuator 25 comprises a generally elongated plane base 27, of a size to be slidably accommodated within the slot 17 in the tubular body 14. The base 27 is provided adjacent one end with an extending portion 28 of a reduced width to form guiding flanges 29 cooperable with the shoulders 19 formed by the slots 17 and 18. Adjacent the other end, the base 27 is provided with an extending toe 30, of a width substantially equal to the width of the extending portion 28. The actuator 25 is further provided with an inclined cam part 31, of a narrower width than the extending portion 28 and toe 30, and inclining from the base 27 adjacent the toe 30, to a point adjacent the extending portion 28, where the cam part 31 is provided with an angular marginal wall merging with the portion 28. The extending portion 28, adjacent the cam part 31, is inclined in a direction parallel to the inclination of the cam part 31.

The actuated member 26 comprises an elongated body of substantially closed U-cross-section, to provide a generally curved surface 32, and a generally flat surface 33, the latter surface being provided with an inclined slot 34, complementary to the inclination of the cam part 31, the inclined slot 34 starting flush with the flat surface 33 adjacent one end of the actuated member 26, and extending towards, but being spaced from the curved surface 32 adjacent the other end. It will be appreciated that the actuated member 26 may be disposed in cooperative relation with the actuator 25, by placing the body of the former, and more particularly the slot 34 thereof, in position on the cam part 31 of the latter, so that relative movement will hold the curved surface 32 of the actuated member 26 in parallelism with the base 27 of the actuator 25.

To assemble the valve mechanism with the tubular body 14, the actuated member 26 may be introduced into the bore 15 thereof, from either end, and brought into alignment with the slot 18. The actuator 25 is then slidably inserted into the slot 17, with the cam part 31 in proper direction with respect to the inclined slot 34 of the actuated member 26, and the latter member is then shifted relative to the actuator 25, so that the inclined slot of the actuated member is positioned on the cam part 31. The actuator 25 is then moved to an extreme position so that the curved portion 32 of the actuator member is substantially in line with the thickened part 23 of the walls of the bore 15. The flexible conduit 11 may then be threaded through the bore and the valve means 13 may be located along the length of the conduit 11 in a desired position. It will be appreciated that the portion of the conduit adjacent the curved portion of the actuated means 26 and the flattened portion of the bore 15 will be slightly restricted, as shown at 35. This slight restriction causes a positive frictional engagement between the conduit 11 and the valve means 13, to hold the latter in a desired position with respect to the former, further preventing the displacement of the parts comprising the valve mechanism, and yieldably holding these parts in operative position.

Assuming that the valve means 13 had been assembled with the conduit 11, and that the actuator 25 is in a position shown in Figures 1, 2, and 3, fluid from the syringe bag 10 may flow through the conduit to the discharge tube 12. However, if the actuator 25 is shifted to the left, to a position shown in Figure 4, the actuated member 26 will move towards the flattened portion 24 of the valve body bore 15, always maintaining its curved surface substantially parallel to the flattened portion 24, and in this movement, compressing the adjacent portion of the flexible conduit between it and the flattened portion until the conduit is squeezed tightly shut, as shown in Figure 4, to interrupt flow of fluid from the syringe bag 10 to the discharge tube 12.

Movement of the actuator 25, in a tube closing position, is limited by the stopping of movement of the actuated member 26, and movement in an opposite direction is limited by abutment of the toe 30 thereof with an end part of the actuated element, the latter being in turn held in the valve body 14 by engagement with the abutments 22 formed by the projecting portions 20 and the relatively narrow slots 21. It will be understood that the actuator 25 may be provided with suitable indicia to indicate the "on" and "off" positions of the valve means 13.

From the foregoing it will be apparent to those skilled in the art that the illustrated embodiment of my invention provides a new and improved valve means, economical in construction and assembly, and accordingly, accomplishes at least the principal object of my invention. It further will be obvious to those skilled in the art that the illustrated embodiment of my invention may be variously changed and modified without departing from the spirit of my invention, or sacrificing all of the advantages thereof, and that accordingly, the disclosure herein is illustrative only, and my invention is not limited thereto.

I claim:

1. Valve means for a resilient conduit, comprising: a body, having a passage for receiving the conduit; actuated means, carried by said body and being generally confined to movement transversely of said passage, and operable to constrict the conduit to interrupt flow therethrough; and actuator means carried by said body, and being relatively movable to said actuated means at substantially right angles to the transverse line of movement of said actuated means; said actuated means and said actuator means comprising cooperating surfaces constructed and arranged to engage in alignment with the transverse movement of said actuated means, to transmit movement from said actuator means to said actuated means.

2. Valve means for a resilient conduit, comprising: a body, having a passage for receiving the conduit; actuated means, carried by said body and being generally confined to movement transversely of said passage, and operable to constrict the conduit to interrupt flow therethrough; and actuator means carried by said body, and being relatively movable to said actuated means at substantially right angles to the transverse line of movement of said actuated means; said actuated means and said actuator means comprising cooperating surfaces constructed and arranged to engage in alignment with the transverse movement of said actuated means, to transmit movement from said actuator means to said actuated means, one of said surfaces being provided with a recess, and the other of said surfaces being provided with a part fitting within said recess, so as to hold said surfaces in operative position.

3. Valve means for a resilient conduit, comprising: a body, having a passage for receiving the conduit; actuated means, carried by said body and being generally confined to movement transversely of said passage, and operable to constrict the conduit to interrupt flow therethrough; and actuator means carried by said body, and being relatively movable to said actuated means at substantially right angles to the transverse line of movement of said actuated means; said actuated means and said actuator means comprising cooperating surfaces constructed and arranged to engage in alignment with the transverse movement of said actuated means, to transmit movement from said actuator means to said actuated means, and in conduit open position, said actuated means and said actuator means being positioned to slightly compress the conduit, so that the resiliency of the conduit will at all times hold said cooperating surfaces in operative relation.

4. Valve means for a resilient conduit, comprising: a body, having a passage for receiving the conduit; actuated means, carried by said body and being generally confined to movement transversely of said passage, and operable to constrict the conduit to interrupt flow therethrough; and actuator means carried by said body, and provided with an abutment, said actuator means being relatively movable to said actuated means at substantially right angles to the transverse line of movement of said actuated means, and being limited in conduit-open direction of movement by engagement of said abutment with a portion of said actuated means; said actuated means and said actuator means comprising cooperating surfaces constructed and arranged to engage in alignment with the transverse movement of said actuated means, to transmit movement from said actuator means to said actuated means, so that movement in conduit-closed direction will cause said actuated means to constrict said conduit, the complete constriction of said conduit providing sufficient resistance to limit movement of said actuator means in a conduit closed direction.

5. Valve means for a resilient conduit, comprising: a body, having a passage for receiving the conduit; actuated means carried by said body for movement generally transversely of said passage, said actuated means having a surface engaging said conduit in substantially tangential relation, said surface constricting the conduit when said actuated means is moved transversely of said passage to interrupt flow through the conduit; and actuator means carried by said body for movement generally parallel to the tangential surface of said actuated means; said actuated means and said actuator means comprising cooperating surfaces constructed and arranged to transmit movement from said actuator means to said actuated means.

6. Valve means for a resilient conduit, comprising: a body, having a passage for receiving the conduit; actuated means, carried by said body and being generally confined to movement transversely of said passage, and operable to constrict the conduit to interrupt flow therethrough; and actuator means, carried by said body, and movable tangentially of said passage to effect movement of said actuated means; said actuated means and said actuator means having engaging surfaces constructed and arranged to transmit motion from said tangentially movable actuator means to said transversely movable actuated means, the motion being transmitted substantially in alignment with the transverse movement of said actuated means.

7. Valve means for a resilient conduit, comprising: a body, having a passage for receiving the conduit; actuated means carried by said body and movable generally transversely of said passage, said actuated means being operable to constrict the conduit to interrupt flow therethrough; and actuator means carried by said body, and movable tangentially of said passage to effect movement of said actuated means; said actuated means and actuator means comprising cooperating wedge surfaces constructed and arranged to move said actuated means transversely when said actuator means is moved tangentially.

8. Valve means for a resilient conduit, comprising: a body, having a passage for receiving the conduit; actuated means, generally confined to movement transversely of said passage, and operable thereby to constrict the conduit to interrupt flow therethrough; and actuator means carried by said body for movement generally tangentially of said passage, and being operable to actuate said actuated means; said actuated means and said actuator means comprising cam means disposed substantially at the intersection of the line of movement of said actuated means with the line of movement of said actuator means, and constructed and arranged to convert such tangential motion of said actuator means into such transverse motion of said actuated means.

THOMAS W. MILLER.